2,918,413
METHOD AND COMPOSITION FOR PRODUCING GIBBERELLINS

Carl T. Redemann, Huntington Beach, Calif., assignor to The Dow Chemical Company, Midland, Mich., a corporation of Delaware No Drawing. Application September 6, 1957
Serial No. 682,279

3 Claims. (Cl. 195—36)

The present invention relates to a new and improved method and composition for increasing the yield of gibberellins from various of the gibberellin-producing fungi such as *Gibberella fujikuroi* and *Fusarium moniliforme* and the like.

The metabolic products of the culturing of gibberellin-producing fungi are in many instances active as plant growth stimulants. Investigation has led different agricultural scientists to classification of these fungi into many forms. It is thought that the fungi whose host is rice, identified as *Gibberella fujikuroi* (Saw.) Wr., *Lisea fujikuroi* Saw., *Gibberella moniforms* (Sheld.) Wineland (the perethical state of *Fusarium moniliforme* on maize), are the fungi which produce a metabolic product which promotes the growth of many plant species. The identification of many other fungi which cause, on numerous other host plants, the "bakanae" disease effect has been accomplished, but reports are at variance as to whether these other strains and species of fungi produce on culture a metabolic product which will promote the growth of plants in the same manner as the product from rice host *G. fujikuroi*.

The gibberellins have been classified in the literature as gibberellin A, gibberellin B, gibberellin X and gibberellic acid (cf. Borrow et al., "Gibberellic Acid," Sci.-Food Agric. 6, June 1955, page 340 et seq. and Stodola et al. "The Microbiological Production of Gibberellin A and X," Arch. of Biochem., 54 (1955), pages 240–245). Gibberellin A and gibberellic acid (Gibberellin X, Stodola, The Isolation, Characterization and Chemical Properties of the Gibberellins, page 7 of a reprint of a talk presented August 28, 1956, at the Symposium on "Natural Plant Growth Regulations, other than Auxins" at the Storrs, Conn., Meeting of The Amer. Inst. of Bio. Science) appear to be the most potent plant growth stimulants although the "bakanae" effect is attributed to other gibberellins as well.

The production of the various gibberellin products is now a commercial enterprise. However, the yield of these new valuable plant growth stimulants per unit volume of employed medium is very low. Attempts to improve the yield by making numerous variations in usual constituents of the nutrient medium and in operating conditions have not brought about significant changes in the yields. Accordingly, any means by which substantial increases in yield can be obtained are of great practical significance.

It has been found that two and three-fold or more increases in gibberellin production are obtained when senecioic acid or potential sources of senecioic acid ions, such as the alkali metal, alkaline earth metal salts, i.e., the sodium, potassium, calcium, magnesium or ammonium salts, are incorporated in the nutrient medium used for the culture of the gibberellin-producing fungi.

The increased yields obtained when operating in accordance with the present invention are striking in the face of the very minor amounts of the acid which promote the increase and the rather narrow range of proportions which operate to give these increases. These compounds are effective at levels ranging from 50 to 300 milligrams per liter of nutrient medium; however, it has been observed that concentrations within the range of 75 to 200 milligrams per liter are especially effective.

In one manner of carrying out the method of the present invention the senecioic acid or its salts are added to an aqueous nutrient culture medium and the medium sterilized. The sterilized medium is inoculated with pure culture of gibberellin-producing fungi and the inoculated medium incubated (fermented) at 25° C. accompanied with mild agitation and aeration with sterile air. The aeration and incubation (fermentation) are continued until the sucrose content has fallen below about 3 grams per liter. Following incubation, the mold is filtered off the aqueous medium and the gibberellin recovered by known methods such as solvent extraction or the like.

Senecioic acid and its salts have been found to be effective in increasing gibberellin production in both surface and submerged fermentation processes, as well as in high or low nitrogen level broths.

The manner in which the senecioic acid or its salts is added to the nutrient medium is not critical. When these compounds are to be present during the entire fermentation period, they may be incorporated in the medium before its sterilization. When they are to be added to cultures in which the mold growth has already become established, they may be added as solutions in water or organic solvents.

The following examples illustrate the present invention but are not to be construed as limiting:

Example 1

The following medium was prepared, and a portion employed as the nutrient medium for culturing *Fusarium moniliforme* and producing gibberellin.

| | Grams per liter |
|---|---|
| Sodium nitrate | 2.0 |
| Dipotassium hydrogenphosphate | 3.0 |
| Magnesium sulfate | 0.5 |
| Potassium chloride | 0.5 |
| Monosodium iron ethylenediamine tetraacetate | 0.05 |
| Sucrose | 30.0 |
| Sodium salt of senecioic acid | 0.122 |
| Antifoam agent (Dow-Corning A) | 0.25 |
| Tap water | To volume |

The medium was adjusted from an original pH value of approximately 8 to a pH value of 7.5, by addition of 4 N HCl, and was then sterilized by steaming (autoclaving) in the conventional manner. After cooling, 12,000 milliliters of the medium were inoculated with spores of pure culture of *Fusarium moniliforme* culture NRRL 2284 obtained from U.S.D.A. control cultures, containing the above adjusted medium but omitting the sodium salt of senecioic acid, were also included in the test. The inoculated media were then incubated (fermented) at 25° C. During incubation the media were aerated with sterile air until the sucrose content had fallen to about 2 grams per liter. Thereafter, the mold was separated from the media by filtration and the media worked up in the manner described by Stodola and co-workers in Archives of Biochemistry, volume 54, pages 240 to 245 (1955). The following assay values on the medium were obtained by the PEA method described by P. N. Brian and H. G. Hemming.

| | Gibberellin yield (milligrams/liter) |
|---|---|
| Nutrient medium only | 22.5 |
| Nutrient medium+0.122 percent sodium salt of senecioic acid | 50 |

Example 2

In an analogous manner 12-liter portions of the culture medium of Example 1 were prepared to supply 0, 50, 100, 200, and 400 parts by weight of the sodium salts of senecioic acid per million parts of culture medium, by employing 0.0, 0.05, 0.10, and 0.20 and 0.40 grams of the sodium salt per liter of medium, respectively. Each such medium was inoculated with spores of *Fusarium moniliforme*, incubated at 25° C. with aeration until the sucrose content had fallen to below 3 grams/liter and the gibberellin separated and assayed in the manner hereinbefore described.

The assay values are set forth below.

| Senecioic acid as sodium salt added in p.p.m. | Yield of Gibberellin in Milligrams per 12 liters |
|---|---|
| 0 | 224 |
| 50 | 365 |
| 100 | 588 |
| 200 | 437 |
| 400 | 191 |

Example 3

In a substantially analogous manner employing a medium in which Arnon's 45 and Arnon's 87 micronutrient solution was substituted for the sucrose of Example 1 a low nitrogen level medium was prepared, inoculated and incubated in exactly the same manner as Example 1. A control procedure was simultaneously carried out without addition of the senecioic acid. The results of the assay 4 days after inoculation are set forth below.

| Nutrient Medium | p.p.m. of Senecioic Acid | Yield of Getherellin (milligrams per liter) |
|---|---|---|
| Nutrient medium plus | 0 | 134 |
| | 50 | 305 |
| | 100 | 515 |
| | 200 | 306 |

Example 4

Employing a nutrient medium containing:

| | | |
|---|---|---|
| Sodium nitrate | grams | 4.0 |
| Dipotassium monohydrogen phosphate | do | 3.0 |
| Magnesium sulfate | do | 0.500 |
| Potassium chloride | do | 0.500 |
| Sodium iron Versenate | do | 0.050 |
| Arnon's A 5 micronutrient solution | milliliters | 1 |
| Arnon's A 7 micronutrient solution | do | 1 |
| Dow Corning Antifoam A | do | 0.25 |
| Tap water to make 1 liter. | | |

Spores of the *moniliforme* culture of Example 1 were incubated for 4 and 6 days in the manner of Example 1.

The results of assays after the 4th and 6th days are set forth below.

| | p.p.m. of Senecioic and as sodium salt | Yield of Gibberellin and milligrams per liter | |
|---|---|---|---|
| | | 4 days | 6 days |
| Nutrient medium | 0 | 133 | 207 |
| | 50 | 194 | 256 |
| | 100 | 328 | 320 |
| | 200 | 205 | 209 |

It is to be clearly understood that other nutrient mediums may be employed in accordance with the present invention so long as senecioic acid or its salts are added to the medium prior to or during culturing of the gibberellin-producing spores. Thus for example ammonium nitrate may be substituted for the sodium nitrate, glucose for sucrose or the Arnon's micronutrient solutions, ferric chloride or ferrous sulfate for the disodium iron ethylene diamine tetraacetate. The antifoam agents may be replaced by decyl alcohol, diphenyl ether, or the like.

I claim:

1. An improved method for the production of gibberellins by the cultivation of a gibberellin-producing fungus in an aqueous nutrient medium which comprises adding to the medium from 50 to 300 milligrams of a member selected from the group consisting of senecioic acid and the alkali metal salts of said acid per liter of nutrient medium.

2. An improved method for the production of gibberellins by cultivating a gibberellin-producing fungus in an aqueous nutrient medium which comprises adding to said medium from 75 to 200 milligrams of a member selected from the group consisting of senecioic acid and the alkali metal salts of said acid per liter of nutrient medium.

3. An improved method for the production of gibberellins by use of an aqueous nutrient medium inoculated with a gibberellin-producing fungus which comprises adding to the inoculated nutrient medium from 50 to 300 milligrams of a member selected from the group consisting of senecioic acid and the alkali metal salts of said acid per liter of nutrient medium.

References Cited in the file of this patent

Chemical Abstracts, 34, 1940, Yabuta, 3314.
Chemical Abstracts, 44, 1950, Yabuta, 10814.
Curtis and Gross: Chemistry and Industry, August 28, 1954, p. 1066.
Gross: Jour. Chem. Soc., December 1954, pp. 4670–4676.
Stodala et al.: Arch. of Biochem., 54, January 1955; pp. 240–245.